(12) United States Patent
Kang

(10) Patent No.: US 8,596,544 B2
(45) Date of Patent: Dec. 3, 2013

(54) RFID TAG

(75) Inventor: Hee-Bok Kang, Gyeonggi-do (KR)

(73) Assignee: Hynix Semiconductor Inc., Gyeonggi-do (KR)

( * ) Notice: Subject to any disclaimer, the term of this patent is extended or adjusted under 35 U.S.C. 154(b) by 98 days.

(21) Appl. No.: 12/904,404

(22) Filed: Oct. 14, 2010

(65) Prior Publication Data

US 2012/0031979 A1 Feb. 9, 2012

(30) Foreign Application Priority Data

Aug. 9, 2010 (KR) .................. 10-2010-0076232

(51) Int. Cl.
*G06K 13/00* (2006.01)

(52) U.S. Cl.
USPC .......................................... 235/492; 235/487

(58) Field of Classification Search
USPC .................. 235/375, 380, 487, 435, 439, 492
See application file for complete search history.

(56) References Cited

U.S. PATENT DOCUMENTS

| | | | | |
|---|---|---|---|---|
| 5,061,917 A | * | 10/1991 | Higgs et al. | 340/539.22 |
| 7,009,519 B2 | * | 3/2006 | Leonard et al. | 340/572.8 |
| 7,394,381 B2 | * | 7/2008 | Hanson et al. | 340/572.4 |
| 7,474,230 B2 | * | 1/2009 | Blom et al. | 340/870.04 |
| 7,646,298 B1 | * | 1/2010 | Osburn et al. | 340/539.26 |
| 2004/0204915 A1 | * | 10/2004 | Steinthal et al. | 702/188 |
| 2005/0248454 A1 | * | 11/2005 | Hanson et al. | 340/539.26 |
| 2005/0248456 A1 | * | 11/2005 | Britton et al. | 340/539.29 |
| 2006/0267731 A1 | * | 11/2006 | Chen | 340/10.1 |
| 2008/0048857 A1 | * | 2/2008 | Billmaier et al. | 340/539.26 |
| 2010/0090802 A1 | * | 4/2010 | Nilsson et al. | 340/10.1 |

FOREIGN PATENT DOCUMENTS

| | | |
|---|---|---|
| JP | 2010-140270 | 6/2010 |
| KR | 100653180 | 12/2006 |
| KR | 1020080084548 | 9/2008 |
| KR | 1020100041649 | 4/2010 |

OTHER PUBLICATIONS

Notice of Allowance issued by the Korean Intellectual Property Office on Mar. 26, 2012.

* cited by examiner

*Primary Examiner* — Daniel Hess
*Assistant Examiner* — Paultep Savusdiphol
(74) *Attorney, Agent, or Firm* — IP & T Group LLP

(57) ABSTRACT

An RFID tag includes an RFID chip, at least one sensor chip stacked on the RFID chip and interfaced with the RFID chip through a bump interface, and a filter layer stacked on the sensor chip to filter a sensing source introduced into the sensor chip.

19 Claims, 5 Drawing Sheets

RFID TAG

CROSS-REFERENCE TO RELATED APPLICATIONS

The present application claims priority of Korean Patent Application No. 10-2010-0076232, filed on Aug. 9, 2010, which is incorporated herein by reference in its entirety.

BACKGROUND OF THE INVENTION

Exemplary embodiments of the present invention relate to an RFID tag.

An radio frequency identification (RFID) is a contactless automatic identification technology which automatically identifies an object by using a radio signal. Specifically, an RFID tag is attached to an object to be identified, and communicates with an RFID reader through transmission/reception of the radio signal. In this manner, the identification of the object is achieved. The use of the RFID can overcome the shortcomings of a conventional automatic identification technology, such as a barcode and an optical character recognition technology.

In recent years, RFID tags are used in various fields, such as a distribution management system, a user authentication system, an electronic cash system, a traffic system, etc.

For example, a distribution management system may perform a commodity classification or an inventory management by using integrated circuit (IC) tags with recorded data instead of using a delivery statement or tag. Also, a user authentication system may perform a room management by using IC cards in which personal information is recorded.

Meanwhile, when an RFID tag is used for temperature-sensitive distribution, there is an increased demand on the detection of the peripheral conditions of the RFID tag, such as tracing of a temperature change by recording the temperature of each check point during the transportation for distribution.

SUMMARY OF THE INVENTION

An exemplary embodiment of the present invention is directed to provide an RFID tag including a sensor that detects the peripheral conditions of the RFID tag.

In accordance with an exemplary embodiment of the present invention, an RFID tag includes: an RFID chip; at least one sensor chip stacked on the RFID chip and interfaced with the RFID chip through a bump interface; and a filter layer stacked on the sensor chip to filter a sensing source introduced into the sensor chip.

In accordance with another exemplary embodiment of the present invention, an RFID tag includes: an RFID chip; a first sensor chip; a first filter layer stacked on the first sensor chip to filter a sensing source introduced into the first sensor chip; a second sensor chip stacked on the first filter layer; a second filter layer stacked on the second sensor chip to filter a sensing source introduced into the second sensor chip; and a sensor interface bus through which the RFID chip is interfaced with the first sensor chip and the second sensor chip.

The first sensor chip may be stacked on the RFID chip.

The sensor interface bus may be formed along sidewalls of the first sensor chip and the second sensor chip.

In accordance with another exemplary embodiment of the present invention, an RFID tag includes: an RFID chip; a sensing and filter unit stacked on the RFID chip and interfaced with the RFID chip through a first bump interface; and a filter layer unit stacked on the sensing and filter unit to filter a sensing source introduced into the sensing and filter unit.

DESCRIPTION OF SPECIFIC EMBODIMENTS

Figure 1:
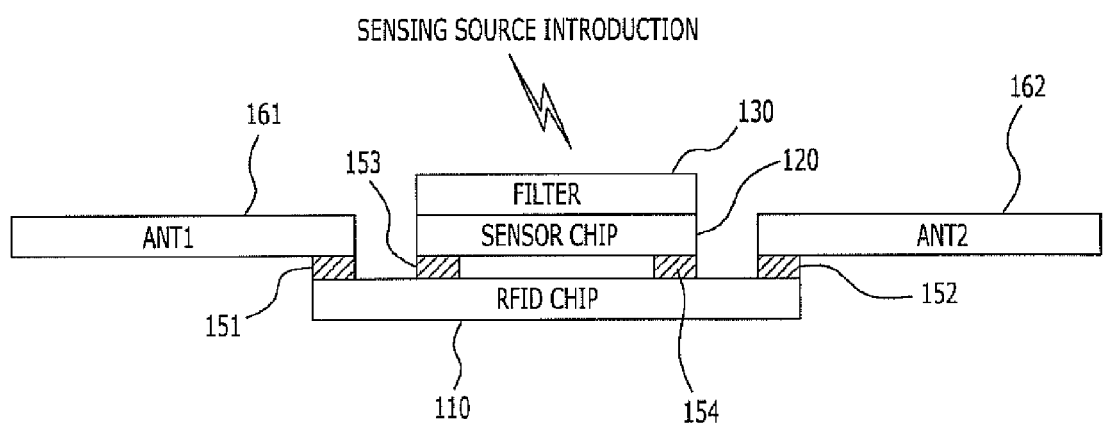
FIG. 1 is a configuration diagram of an RFID tag in accordance with an exemplary embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

FIG. 1 is a configuration diagram of an RFID tag in accordance with an exemplary embodiment of the present invention.

Referring to FIG. 1, the RFID tag includes an RFID chip 110, a sensor chip 120 stacked on the RFID chip 110 and interfaced with the RFID chip 110 through first bump interfaces 153 and 154, and a filter layer 130 stacked on the sensor chip 120 to filter a sensing source input to and sensed by the sensor chip 120. The RFID tag includes one or more antennas 161 and 162 interfaced with the RFID chip 110 through second bump interfaces 151 and 152.

The sensing source sensed by the sensor chip 120 may include any one of radiation, ionization, heat conduction and vibration, and the type of the sensor chip 120 varies depending on a sensing source to be sensed.

The filter layer 130 is stacked on the sensor chip 120 to filter a desired type and amount of the sensing source introduced into the sensor chip 120.

The RFID chip 110 is configured to receive information sensed by the sensor chip 120 through the first bump interfaces 153 and 154, store the information in an internal memory, and transmit the information stored in the memory to a receiver located at the outside of the RFID tag through the antennas 161 and 162.

FIG. 1 shows an example in which the two antennas 161 and 162 are interfaced with the RFID chip 110 through the first bump interfaces 151 and 152, respectively. However, this is for illustrative purposes only. For example, the number of the antennas may vary depending on the type and number of frequencies used for the RFID chip 110. Furthermore, FIG. 1 shows an example in which the RFID chip 110 is interfaced with the sensor chip 120 through the first bump interfaces 153 and 154. Alternatively, the RFID chip 110 may be interfaced with the sensor chip 120 through any number of bump interfaces including one.

With such a configuration, the RFID tag may effectively transmit peripheral information of the RFID tag, which is sensed by the sensor chip 120, to a receiver (an RFID reader) located at the outside of the RFID tag.

Figure 2:
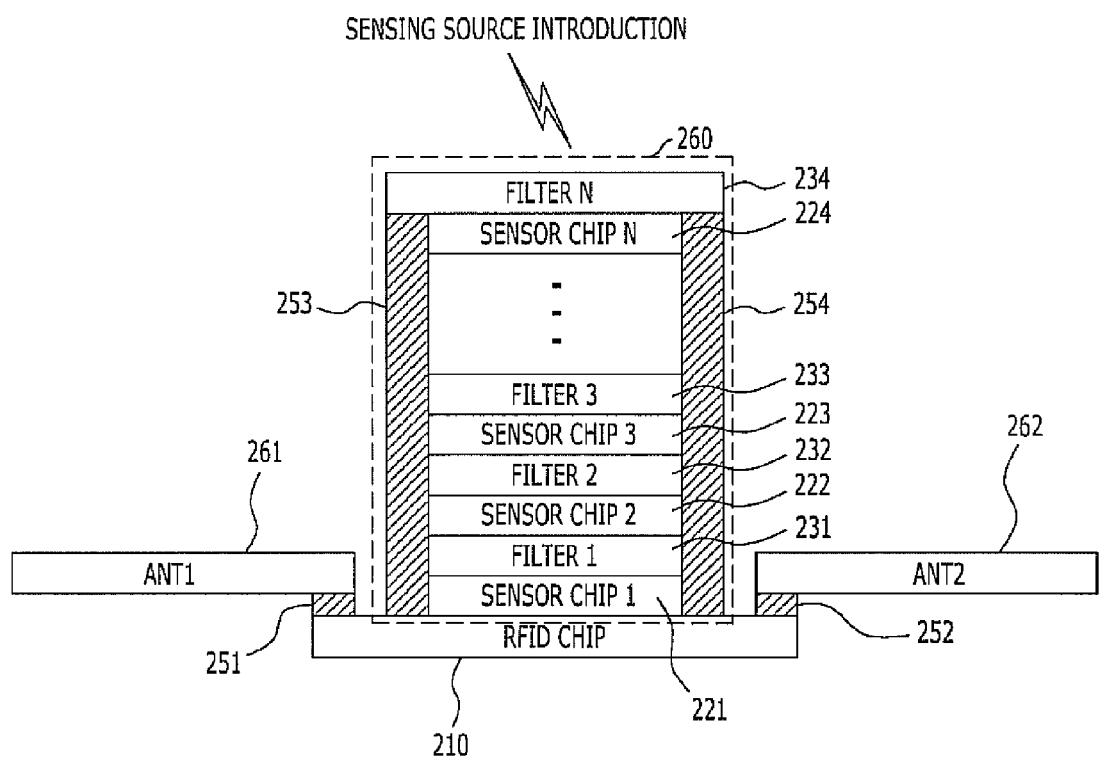
FIG. 2 is a configuration diagram of an RFID tag in accordance with another exemplary embodiment of the present invention.

FIG. 2 is a configuration diagram of an RFID tag in accordance with another exemplary embodiment of the present invention.

Referring to FIG. 2, the RFID tag includes an RFID chip 210, a sensing and filter unit 260 stacked on the RFID chip 210, where the sensing and filter unit 260 includes a first sensor chip 221 stacked on the RFID chip 210, a first filter layer 231 stacked on the first sensor chip 221 to filter a sensing source introduced into the first sensor chip 221, a second sensor chip 222 stacked on the first filter layer 231, a second filter layer 232 stacked on the second sensor chip 222 to filter a sensing source introduced into the second sensor chip 222. The RFID tag further includes interface buses 253 and 254 through which the RFID chip 210 is interfaced with the first sensor chip 221 and the second sensor chip 222. Furthermore, the RFID tag may include third to $n^{th}$ sensor chips 223 to 224 in addition to the first sensor chip 221 and the second sensor chip 222, and third to $n^{th}$ filter layers 233 to 234 for filtering a sensing source introduced into the third to $n^{th}$ sensor chips 223 to 224. The RFID tag includes one or more antennas 261 and 262 interfaced with the RFID chip 210 through second bump interfaces 251 and 252.

The sensing source sensed by the sensor chips 221 to 224 may include at least one of radiation, ionization, heat conduction and vibration, and the type of the sensor chips varies depending on a sensing source to be sensed. Different sensor chips 221 to 224 may sense different sensing sources, respectively. Alternatively, some of the sensor chips 221 to 224 may also have the same type and sense the same sensing source.

The filter layers 231 to 234 are stacked on the sensor chips 221 to 224, respectively, to filter the type and amount of the sensing source introduced into the corresponding sensor chips 221 to 224.

The sensor chips 221 to 224 are interfaced with the RFID chip 210 through the interface buses 253 and 254. The RFID chip 210 is configured to receive information sensed by the sensor chips 221 to 224 through the interface buses 253 and 254, store the information in an internal memory, and transmit the information stored in the memory to a receiver (an RFID reader) located at the outside of the RFID tag through the antennas. The interface buses 253 and 254 may be formed along the sidewalls of the sensor chips 221 to 224 stacked as shown in FIG. 2.

Since the interface buses 253 and 254 perform the same operation as that of the first bump interfaces 153 and 154 shown in FIG. 1, but are used for the interface between the sensor chips 221 to 224 and the RFID chip 210, they are referred to as interface buses.

FIG. 2 shows an example in which the sensor chips 221 to 224 are interfaced with the RFID chip 210 through the two interface buses 253 and 254. Alternatively, the sensor chips 221 to 224 may be interfaced with the RFID chip 210 through any number of interface buses including one. Furthermore, FIG. 2 shows an example in which the two antennas 261 and 262 are interfaced with the REID chip 210 through the second bump interfaces 251 and 252, respectively. However, this is for illustrative purposes only. For example, the number of the antennas may vary depending on the type and number of frequencies used for the RFID chip 210.

In accordance with the RFID tag shown in FIG. 2, a plurality of sensor chips 221 to 224 are a plurality of filter layers 231 to 234 are stacked using an interleaving method, thereby achieving analysis capability with high precision and high efficiency when determining and analyzing the type, size and intensity of a sensing source to be sensed.

Figure 3:
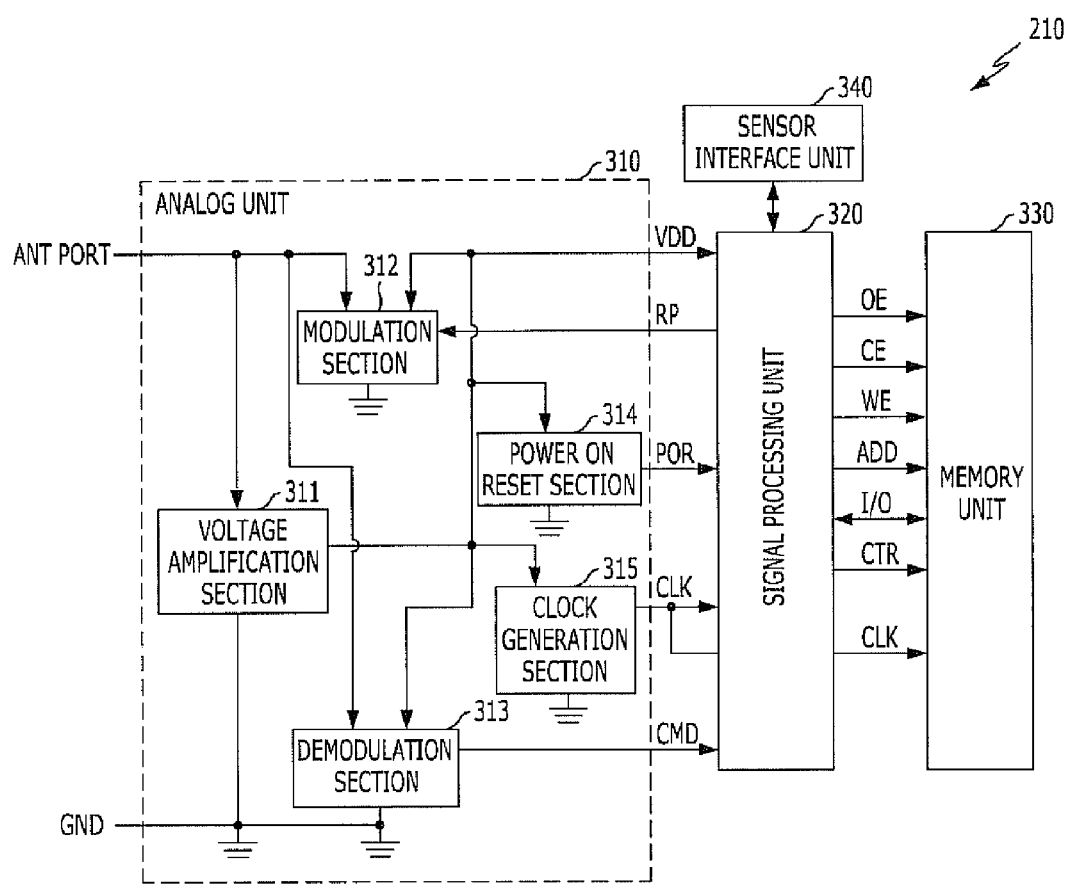
FIG. 3 is a configuration diagram of an RFID chip of FIG. 2 in accordance with an exemplary embodiment of the present invention.

FIG. 3 is a configuration diagram of the RFID chip 210 of FIG. 2 in accordance with the exemplary embodiment of the present invention.

Referring to FIG. 3, the RFID chip 210 includes an analog unit 310, a signal processing unit 320, a memory unit 330, and a sensor interface unit 340.

An antenna is coupled to an antenna port ANT PORT to receive a radio signal transmitted from an RFID reader, transmit the radio signal to a demodulation section 313 of the analog unit 310, and transmit a radio signal demodulated by the demodulation section 313 to the RFID reader.

A voltage amplification section 311 is configured to generate a supply voltage VDD by rectifying and amplifying the radio signal received through the antenna port ANT PORT. The supply voltage VDD is supplied to circuits in the RFID chip 210 to drive the circuits.

The demodulation section 313 is configured to generate a command signal CMD by demodulating the radio signal received through the antenna port, and output the command signal CMD to the signal processing unit 320.

The command signal CMD is used for controlling the internal circuit operations of the signal processing unit 320 and the memory unit 330.

A clock generation section 315 is configured to generate a clock CLK for synchronizing the internal circuit operations of the signal processing unit 320 and the memory unit 330.

A power on reset section 314 is configured to detect the supply voltage VDD generated by the voltage amplification section 311, generate a power-on reset signal POR for controlling a reset operation, and output the power-on reset signal POR to the signal processing unit 320.

The power-on reset signal POR rises together with the supply voltage VDD during a change from a low level to a high level of the supply voltage VDD, changes to a low level from a high level at the time that the supply voltage VDD at a desired high level is supplied, and resets the signal processing unit 320 and the memory unit 330 in the RFID chip 210.

The signal processing unit 320 is configured to receive the supply voltage VDD from the voltage amplification section 311, operate in response to the power-on reset signal POR, the clock CLK and the command signal CMD, and generate a control signal CTR for reading and writing input/output data I/O from/to the memory unit 330. The signal processing unit 320 is configured to generate a response signal RP corresponding to the command signal CMD and output the response signal RP to a modulation section 312.

The signal processing unit 320 is configured to output an address ADD, the input/output data I/O, the control signal CTR, a chip enable signal CE, a write enable signal WE, and an output enable signal OE to the memory unit 330.

The sensor interface unit 340 is configured to communicate with the sensor chips 221 to 224 through the interface buses 253 and 254 and transmit data (that is, a sensing result), which is received from the sensor chips 221 to 224, to the signal processing unit 320.

The memory unit 330 includes one or more memory cells.

The address ADD is a signal that represents an address of a memory cell in which the input/output data I/O is to be stored (that is, a signal including position information of the memory cell).

The control signal CTR represents one or more signals used for controlling an operation for reading/writing the input/output data I/O from/to a memory cell.

The chip enable signal CE is used for activating the operation of the memory unit 330.

The write enable signal WE is used for activating a writing operation when data is written in a memory cell.

The output enable signal OE is used for activating an output operation of read data when the data stored in a memory cell is read.

The memory unit 330 may use a volatile or non-volatile memory device.

Specifically, the memory unit 330 may use a nonvolatile ferroelectric memory, that is, a ferroelectric random access memory (FeRAM). The FeRAM has a data processing speed similar to that of a dynamic random access memory (DRAM). The FeRAM has a structure substantially similar to that of the DRAM and has a high remanent polarization (i.e., a characteristic of ferroelectric) because the FeRAM uses ferroelectric as a capacitor material. As a result, data is not erased even though an electric field is removed.

The RFID chip 110 of FIG. 1 may have the same configuration as that of the FIG. 3 RFID chip.

Figure 4:
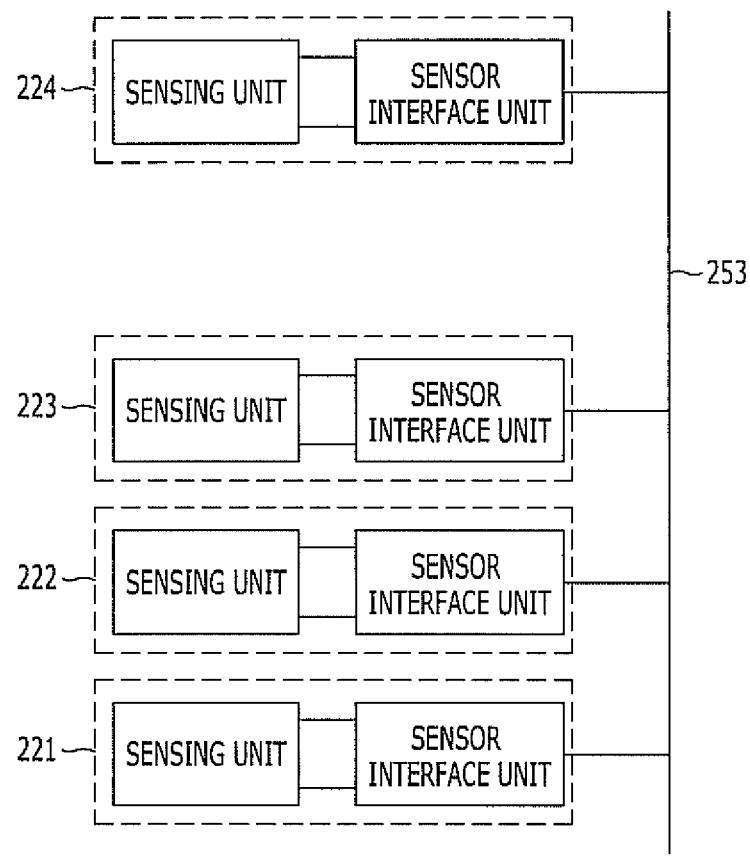
FIG. 4 is an internal configuration diagram of sensor chips shown in FIG. 2.

FIG. 4 is an internal configuration diagram of the sensor chips 221 to 224 shown in FIG. 2.

Each of the sensor chips 221 to 224 includes a sensing unit and a sensor interface unit. The type of the sensing unit may vary depending on the type of a sensing source to be sensed by the sensor chips. The sensor interface unit is configured to transmit a detection result of the sensing unit to the RFID chip 210 through the sensor interface bus 253.

Figure 5:
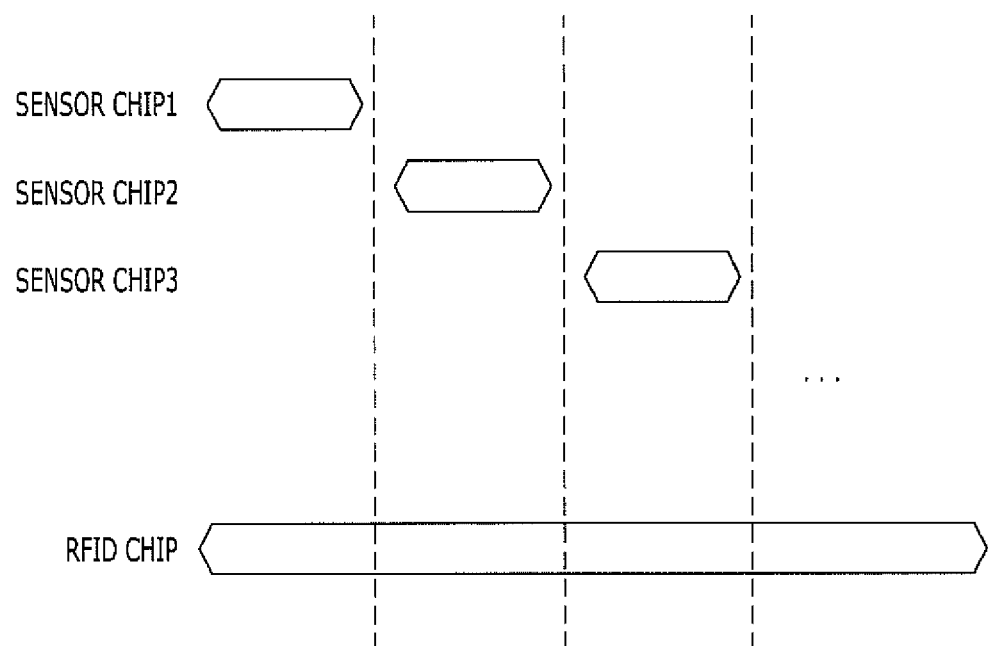
FIG. 5 is a timing diagram showing data exchange sections between the RFID chip and the sensor chips in FIG. 2.

FIG. 5 is a timing diagram showing data exchange sections between the RFID chip 210 and the sensor chips 221 to 224 in FIG. 2.

As shown in FIG. 5, according to an example, data exchange between the RFID chip 210 and the sensor chips 221 to 224 is performed at timings different from one another. When data is exchanged between the sensor chip 221 and the RFID chip 210, no data is exchanged between the sensor chips 222 to 224 and the RFID chip 210. According to the example, data collision may be prevented from occurring on the sensor interface buses 253 and 254.

While the present invention has been described with respect to the specific embodiments, it will be apparent to those skilled in the art that various changes and modifications may be made without departing from the spirit and scope of the invention as defined in the following claims.

What is claimed is:

1. A radio frequency identification (RFID) tag comprising:
   an RFID chip;
   a plurality of sensor chips formed on the RFID chip, in a direction perpendicular to a surface of the RFID chip, and interfaced with the RFID chip through a first bump interface; and
   a plurality of filter layers, wherein each filter layer, of the plurality of filter layers, is formed on a corresponding sensor chip, of the plurality of sensor chips, and wherein each filter layer, of the plurality of filter layers, is to filter a corresponding input from a corresponding source, and to communicate the corresponding filtered input to the corresponding sensor chip of the plurality of sensor chips.

2. The RFID tag of claim 1, further comprising:
   at least one antenna interfaced with the RFID chip through a second bump interface.

3. The RFID tag of claim 2, wherein the RFID chip is to communicate, via the antenna, information associated with the corresponding input to an external receiver.

4. The RFID tag of claim 1, wherein the plurality of sensor chips are to detect at least one of radiation, ionization, heat conduction, or vibration.

5. The RFID tag of claim 1, wherein the plurality of sensor chips are commonly connected to a sensor interface bus, and each sensor chip, of the plurality of sensor chips, is to transmit, via the sensor interface bus, information associated with the corresponding filtered input to the RFID chip.

6. The RFID tag of claim 5, wherein each sensor chip, of the plurality of sensor chips, is to transmit the information associated with the corresponding filtered input to the RFID chip at a different time.

7. A Radio Frequency Identification (RFID) tag comprising:
   an RFID chip;
   a first sensor chip formed on the RFID chip;
   a first filter layer formed on the first sensor chip, wherein the first filter layer is to filter a first input, from a first source, and to communicate the filtered first input to the first sensor chip;
   a second sensor chip formed on the first filter layer;
   a second filter layer formed on the second sensor chip, wherein the second filter layer is to filter a second input, from a second source, and to communicate the filtered second input to the second sensor chip; and
   a sensor interface bus to interface the first sensor chip and the second sensor chip with the RFID chip.

8. The RFID tag of claim 7, wherein the first sensor chip is formed on the RFID chip.

9. The RFID tag of claim 8, wherein the sensor interface bus is formed along sidewalls of the first sensor chip and the second sensor chip.

10. The RFID tag of claim 7, further comprising at least one antenna interfaced with the RFID chip through a second bump interface.

11. The RFID tag of claim 7, wherein a timing of an information exchange, via the sensor interface bus, between the RFID chip and the first sensor chip is different than a timing of an information exchange, via the sensor interface bus, between the RFID chip and the second sensor chip.

12. The RFID tag of claim 7, wherein the first filter layer is to filter a characteristic of the first input, communicated to the first sensor chip, and the second filter layer is to filter a characteristic of the second input, communicated to the second sensor chip.

13. A Radio Frequency Identification (RFID) tag comprising:
   an RFID chip;
   a plurality of sensing and filtering units alternately formed on the RFID chip, in a direction perpendicular to a surface of the RFID chip, the plurality of sensing and filtering units being interfaced with the RFID chip through a first bump interface, wherein each of the plurality of sensing and filtering units comprises:
      a sensor chip; and
      a filter layer formed on the sensor chip, wherein the filter layer is to filter an input from a corresponding source, and to communicate the filtered input to the sensor chip; and
   at least one antenna interfaced with the REID chip through a second bump interface.

14. The RFID tag of claim 13, wherein the plurality of sensing and filtering units are to detect at least one of radiation, ionization, heat conduction, or vibration.

15. The RFID tag of claim 13, wherein the RFID chip is to receive, from each one of the plurality of sensing and filtering units, information associated with a corresponding input, received by each one of the plurality of sensing and filtering units, and to communicate, via the antenna, the information to an external receiver.

16. The RFID tag of claim 13, wherein the sensor chip is to communicate with the RFID chip via the first bump interface.

17. The RFID tag of claim 13, wherein the first bump interface is formed along sidewalls of sensor chip.

18. The RFID tag of claim 13, wherein a timing of an information exchange, via the first bump interface, between the RFID chip and one of the plurality of sensor chips, is different than a timing of an information exchange, via the first bump interface, between the RFID chip and another one of the plurality of sensor chips.

19. The RFID tag of claim 13, wherein the filter layer is to filter a characteristic of the input from the corresponding source, and to communicate the filtered characteristic to the sensor chip sensor chips.

* * * * *